Sept. 18, 1962  P. WILLEMS  3,054,565
KNEADING AND MIXING APPARATUS
Filed Aug. 6, 1956  2 Sheets-Sheet 1

INVENTOR.
Peter Willems
BY Richard Lord
Agt

Sept. 18, 1962 P. WILLEMS 3,054,565
KNEADING AND MIXING APPARATUS
Filed Aug. 6, 1956 2 Sheets-Sheet 2
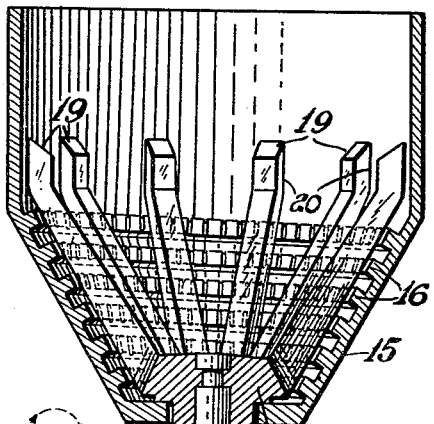
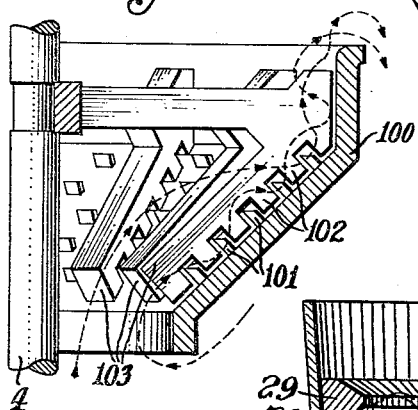
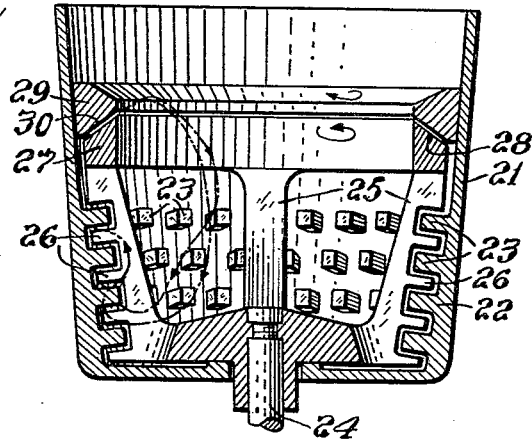
INVENTOR.
Peter Willems
BY

United States Patent Office 3,054,565
Patented Sept. 18, 1962

---

3,054,565
KNEADING AND MIXING APPARATUS
Peter Willems, Steinhofhalde 20–22, Lucerne, Switzerland
Filed Aug. 6, 1956, Ser. No. 602,209
Claims priority, application Switzerland Aug. 12, 1955
12 Claims. (Cl. 241—46)

This invention relates to a kneading and mixing apparatus comprising a container and at least one disintegrating member rotating along the inside wall of the container and cooperating with this inside wall for treating a material by shearing and frictional working.

Known kneading and mixing apparatus of this kind have specific pumping means (blades) for feeding the material to be treated from the bottom of a rotor into an upwardly and outwardly inclined canal equipped with disintegrating members. Thereby the material is only pumped at the bottom of the rotor into the said canal and has to rise in the relatively narrow canal in longitudinal direction of the distintegrating members. Therefore, only the layer of the material just above the bottom of the container is involved in the kneading and mixing operation. Thus, for instance a heavy body or particle on the bottom of the container is pumped upwardly in the said canal and will fall towards the center of the container space after having left the upper or outlet end of the said canal, and will float on the surface of the material until it is again brought near the inlet opening of the canal due to the slow circulation of the material.

The kneading and mixing apparatus according to this invention differs basically from such known devices in that the material is admitted transversally of the longitudinal extent of the disintegrating member over the whole working space of the apparatus, the material being sucked into the space by the disintegrating member or members which act as pumping elements, thrown outwardly, and finally conveyed upwardly of, the material being sucked in and conveyed along the inside wall of the container. Thus, the material is not forced to flow through a narrow canal. Instead, it moves into the working space, as has been indicated, in a direction generally transversally of the longitudinal extent of the disintegrating members and fills the whole height of that space dispensed with because the pumping action is effected by the disintegrating members themselves.

By means of the kneading and mixing apparatus according to this invention materials of any kind, that is, solid, elastic, plastic materials, liquids of any viscosity, and gaseous materials may be treated separately or in any desired combination and mixture. Thereby physical effects are obtained, such as pressing, tearing and shredding, shearing, kneading, rubbing, grating, beating, solving, mixing, cavitation, homogenizing, at controllable speed and frequency and under heating or cooling when desired. Electrical energy may be conducted through the material during treatment in the apparatus, whereby electrical terminals are provided on the container and on the rotor, the container and the rotor constituting electrically isolated treating electrodes. Chemical reactions or other chemical effects may occur during treatment of the material or mixture in the apparatus according to this invention.

The attached drawings illustrate, by way of example, some embodiments of the kneading and mixing device according to this invention.

FIG. 3 is a sectioned elevation of a modified apparatus;

FIG. 4 is a sectioned elevation of another modification; and

FIG. 5 is a fragmentary view of a further modification of my apparatus.

Figure 1:
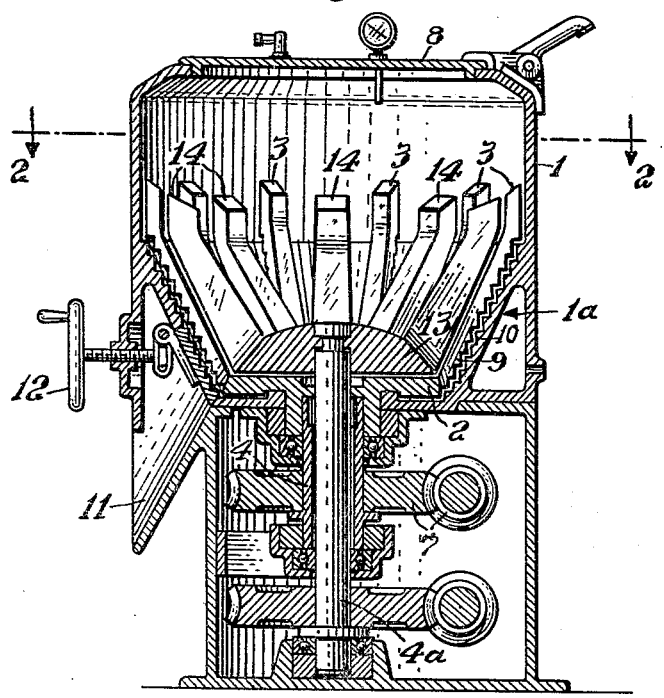
FIG. 1 is a vertical section through an apparatus of my invention, the section being taken in the plane of the line 1—1 of FIG. 2, the view also showing the associated parts.
Figure 2:
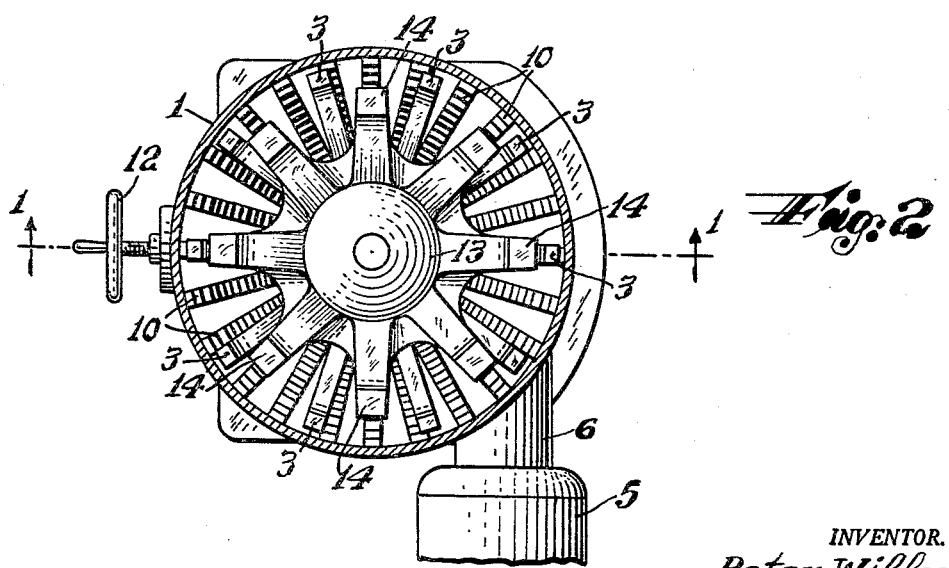
FIG. 2 is a horizontal section taken in the plane of the line 2—2 of FIG. 1.

In the embodiment illustrated in FIGS. 1 and 2 a bell-shaped container 1 opened at its upper end and having an inside wall of circular cross section is mounted on a socket casing and serves as a stator of the kneading and mixing apparatus. The container has an upwardly widening conical portion 1a. Coaxial with the conical portion 1a and thus with the container 1 a star-shaped body or rotor 2 is provided at a little distance over the bottom of the container 1, the body or rotor 2 having ten arms 3 constituting distintegrating members cooperating with the inside wall of the container portion 1a by shearing and frictional working. The star-shaped body 2 is fixed on a hollow shaft 4 driven from a motor 5 over a transmission gear 6, for instance, a change-over gear, for regulating the speed of the rotor 2 and over gears 7, whereby the arms 3 will rotate along the inside wall of the container 1a. By means of a well known lifting device not shown in the drawing the hollow shaft 4 together with the rotor 2 may be displaced axially in order to adjust the distance between the arms 3 and the inside wall of the container portion 1a to any desired value.

When a material is filled from above into the container, to which end the cover 8 of the container 1 is opened, the material falls between the arms 3 against the inside wall of the container portion 1a. When subsequently the star-shaped body with its arms 3 is rotated the material is pressed between the arms 3 against the inside wall of the container portion 1a by the centrifugal force acting on it and is sheared and disintegrated. On the side facing the container portion 1a the arms 3 are provided with teeth 9. Similar teeth 10 are provided on the inside wall of the container portion 1a. When the material has sufficiently been disintegrated and homogenized the outlet 11 is opened by means of the hand wheel 12, whereupon the material is discharged from the container portion 1a through the outlet opening 11 by the still rotating arms 3.

In the construction of FIGS. 1 and 2, a further star-shaped body 13 is used. Arms 14 of this body also constitute disintegrating members. The smooth outer surfaces of the arms 14 are situated relatively near the smooth inner surfaces of the arms 3 of the body 2 for obtaining a good shearing action between arms 3 and 14. Since the star-shaped body 13 is fixed on the central shaft 4a which is driven by motor 5 but in opposite direction to the hollow shaft 4 of the rotor 2, the cages formed by the arms 3 and the arms 14 respectively will rotate relatively to each other about the same axis. The arms 14 enclose a bell-shaped interior space. The material contained in the said central space is first carried along by the arms 14 over their whole working space in circumferential direction. Thereby the material is fed outwardly, that is in transversal direction to the longitudinal extension of the arms 14 through the gaps formed between arms 14, the material being thereby squeezed against the sides of arms 3 and sheared on the edges of arms 3 and kneaded, disintegrated and homogenized between arms 14 and 3. Subsequently the material is moved outwardly through the gaps formed between the arms 3 due to the centrifugal force, and along the inside wall of the container, thereby being disintegrated and homogenized under a pressure corresponding to the acting centrifugal force. Since the material is continuously fed from the central space by the arms 14 into the gaps formed between arms 3, the material on the container wall has to move upwardly along the inside wall of the container portion 1a under the pressure of the following material and under the action of the centrifugal force.

Stresses will build up in the material as it rises and will cause same to move in some places away from the inner wall of the container portion 1a to reach again the shearing edges of arms 14 and 3. In this way, a repeated or continuous disintegrating and mixing action is obtained. The material leaving the working space of the arms 3 and 14 in upward direction falls continuously back over the upper end of arms 14 and 3 into said central space and is again subjected to the kneading and mixing action described above.

If desired the cage with arms 14 may be removed so that the kneading and mixing apparatus comprises only the arms 3 and the container, the kneading and mixing operation being effected between arms 3 and the inside wall of the container.

In the embodiment of FIG. 3, an upwardly widening conical portion 15 of a container is interiorly provided with spiral-shaped toothed ribs 16. A star-shaped body 17 rotatably mounted on a shaft 18 carries arms 19 the outer faces 20 of which are smooth and cooperate with the toothed ribs to produce tearing, shredding and shearing actions on coarse particles of the material to be comminuted.

In the construction of FIG. 4, an upwardly widening conical container 21 is provided with ribs 22, and these ribs, in turn, are provided with toothlike projections 23. A shaft 24 has arms 25 secured thereto. The arms have toothlike projections 26, which, with the apparatus in operation, cooperate with the projections 23. Fixed to the arms 25 is a ring 27 which has a conical rubbing surface 28, and fixed to the container is a ring 29 which, too, has a conical rubbing surface designated 30. Material to be treated is thrown outwardly to enter the spaces between the teeth 26 and 23 and to be subjected to comminuting actions. The material rising upwardly between the opposing teeth and along the inner face of the container enters between the conical ring surfaces 28 and 30 and is there reduced to a colloidal state.

FIG. 5 shows another embodiment of the comminuting apparatus of the invention, in which knives or teeth 101 are not provided on ribs but directly on the inner wall of a container 100. The teeth 101 are arranged in horizontal rows, the circumferential space between adjacent teeth being relatively small. Also, the teeth 101 are sharpened at their lower edges. The teeth 102 of arms 103 and the gaps formed between such teeth are of rectangular cross section and in the engaging condition, the teeth 101 are received in the gaps between adjacent teeth 102. By lifting or lowering the rotating disintegrating member the play between the teeth 102 and the cutting edges of the knives or teeth 101 may be adjusted to a suitable value.

The kneading and mixing apparatus according to this invention may be used in various forms and sizes. When using two rotating bodies, the inner rotating body may, for instance, be equipped with two or one disintegrating members or arms, while the outer disintegrating body may be equipped with a higher number of arms and/or the container may be equipped with a higher number of ribs or other projections. The container may be tiltable. For other purposes, the rotating arms may directly cooperate with a smooth inside wall of the container. The arms may removably be attached to a hub or the driving shaft in order to change the number of effective arms and/or the distance between adjacent arms. It may be of advantage to provide different distances between the arms. The container wall and/or the rotating arms may be provided with bores or other recesses which may produce mechanical pulses up to highest frequencies (supersonic frequencies) when recesses pass each other. The apparatus according to this invention may be mounted on or in any other device when desired. The apparatus may be operated in any desired position, for instance, in horizontal position, whereby the untreated material is fed into the container under pressure. The apparatus may also operate with the inlet for the untreated material at the bottom and with the outlet for the treated material at its top end whereby, in which case the material to be treated is fed through the apparatus under pressure. Further, a number of operating stages may be disposed one behind the other in a pipe or tube, whereby the disintegrating members of successive stages are so designed that the material is successively more and more disintegrated.

The present invention ensures substantial qualitative and quantitative improvements in the disintegration of materials and a highly improved versatility of service, when compared with known kneading and mixing devices.

The pumping effect obtained by the cooperation of the rotating disintegrating member and the container may be used for emptying the container.

While the invention has been described and illustrated with reference to specific embodiments thereof, it will be understood that other embodiments may be resorted to without departing from the invention. Therefore, the forms of the invention set out above should be considered as illustrative and not as limiting the scope of the following claims.

What I claim is:

1. In a kneading and mixing apparatus, a container including an upwardly widening conical portion having a side wall, a drive shaft mounted to extend coaxially with the container, and arms spacedly supported by the shaft for rotation, the arms defining, when rotating, a central space and having flanks and outer faces, the outer faces extending in a spaced but cooperating relationship with respect to, and along the longitudinal extent of, the inner face of said side wall, the peripheral spaces between said outer faces and said inner faces being accessible over substantially the whole longitudinal extent of the outer faces to material to be treated, when moving from said central space toward said inner face, and vice versa, respectively, said flanks, with the apparatus in operation, acting upon material in the central space at every level thereof to propel same outwardly.

2. In the apparatus according to claim 1, comminuting means provided on said inner face, said outer faces cooperating with said comminuting means to perform a comminuting action.

3. In the apparatus according to claim 2, said comminuting means being constituted by ribs extending in directions assumed by the generatrix of said side wall.

4. In the apparatus according to claim 3, said outer faces forming, and said ribs being provided with, toothlike formations.

5. In the apparatus according to claim 4, the toothlike formations of the outer faces and ribs being alternatingly arranged in circular rows.

6. In the apparatus according to claim 1, said arms being supported on said shaft by carrier means mounted on the shaft on the side of the wider end of said conical portion.

7. In the apparatus according to claim 4, the toothlike formations of the outer faces being of rectangular shape, the toothlike formations of the outer faces and ribs being arranged so that the latter engage between the former, and vice versa.

8. In the apparatus according to claim 3, said outer faces and ribs bearing cooperating projections.

9. In the apparatus according to claim 2, said comminuting means being constituted by spiral-shaped ribs provided with teeth.

10. In a kneading and mixing apparatus, a container including an upwardly widening conical portion having a side wall, said side wall defining an upwardly widening conical space open at both ends, comminuting means interiorly provided on said side wall, a drive shaft mounted to extend coaxially with the container, carrier arms secured to the drive shaft to extend in radial outward directions on the side of the wider opening of said conical space, arms carried by said carrier arms and extending in a cooperating relationship with respect to, and along the longitudinal extent of, the inner face of said side wall, said arms defining, when rotating, a central space and having flanks and outer faces, the outer faces, with the apparatus in operation, cooperating with said comminuting means, said outer faces and comminuting means being constituted by circularly arranged rows of teeth, the rows of teeth of the outer faces engaging between rows of teeth of the comminuting means, and vice versa, said flanks acting upon material in the central space at every level thereof to propel same outwardly.

11. In a kneading and mixing apparatus, a container mounted to be stationary and having a portion of upwardly widening conical shape, said portion having a side wall defining an open-ended upwardly widening conical space, toothed ribs interiorly provided on said side wall, a drive shaft mounted to extend coaxially with the container, carrier means secured to the shaft to extend on the side of the wider opening of said conical space in outward directions, arms carried by said carrier means and extending in cooperating relationship with respect to, and along the longitudinal extent of, the inner face of said side wall, said arms defining, when rotating, a central space and having flanks and outer faces, the outer faces being constituted by rectangularly shaped teeth, the teeth of the ribs engaging between the teeth of the outer faces, and vice versa, said flanks, with the apparatus in operation, acting upon material in the central space at every level thereof to propel same outwardly.

12. In the apparatus according to claim 1, cooperating projections on said inner face of the side wall and on said outer faces of the arms.

References Cited in the file of this patent

UNITED STATES PATENTS

| | | |
|---|---|---|
| 611,432 | Katzenstein | Sept. 27, 1898 |
| 740,751 | Friedman | Oct. 6, 1903 |
| 1,036,253 | Jordan | Aug. 20, 1912 |
| 1,488,622 | Sleeper | Apr. 1, 1924 |
| 1,624,567 | Teague | Apr. 12, 1927 |
| 1,771,327 | Snow | July 22, 1930 |
| 1,819,118 | Prelenthner | Aug. 18, 1931 |
| 1,850,150 | Horn | Mar. 22, 1932 |
| 1,851,071 | Travis | Mar. 29, 1932 |
| 1,862,906 | Prelenthner | June 14, 1932 |
| 2,012,680 | Hammes | Aug. 27, 1935 |
| 2,098,483 | Bonham | Nov. 9, 1937 |
| 2,278,051 | Ambrose | Mar. 31, 1942 |
| 2,295,362 | Schnuck | Sept. 8, 1942 |
| 2,390,898 | Rechtin et al. | Dec. 11, 1945 |
| 2,428,420 | Green | Oct. 7, 1947 |
| 2,436,767 | Gerlicher | Feb. 24, 1948 |
| 2,442,812 | Jordan | June 8, 1948 |
| 2,461,720 | Cadwood et al. | Feb. 15, 1949 |
| 2,473,558 | Wuensch | June 21, 1949 |
| 2,477,096 | Silcox | July 26, 1949 |
| 2,534,944 | Bissey | Dec. 19, 1950 |
| 2,553,582 | Heller et al. | May 22, 1951 |
| 2,567,523 | Moore | Sept. 11, 1951 |
| 2,594,785 | Meeker | Apr. 29, 1952 |
| 2,661,666 | Knoll | Dec. 8, 1953 |
| 2,730,308 | Jordan | Jan. 10, 1956 |
| 2,772,836 | Gebhart | Dec. 4, 1956 |

FOREIGN PATENTS

| | | |
|---|---|---|
| 184,868 | Germany | Feb. 13, 1906 |
| 287,813 | Switzerland | Apr. 16, 1953 |
| 661,846 | Germany | June 29, 1938 |
| 708,484 | Germany | July 22, 1941 |